United States Patent

Hollins

[15] 3,699,506
[45] Oct. 17, 1972

[54] CLAMP FOR VEHICLE STORAGE BATTERY SPRING TYPE CABLE TERMINAL

[72] Inventor: Jesse R. Hollins, One Chester Drive, Great Neck, N.Y. 11021

[22] Filed: Feb. 8, 1971

[21] Appl. No.: 113,352

[52] U.S. Cl. ............................................. 339/237
[51] Int. Cl. ........................................... H01r 11/26
[58] Field of Search ............................. 339/224–240

[56] References Cited

UNITED STATES PATENTS

| | | | |
|---|---|---|---|
| 1,997,981 | 4/1935 | Spears | 339/237 |
| 2,210,827 | 8/1940 | Zaborsky | 339/237 |
| 2,962,689 | 11/1960 | Johnson et al. | 339/228 |

*Primary Examiner*—Joseph H. McGlynn
*Attorney*—Kirschstein, Kirschstein, Ottinger & Frank

[57] ABSTRACT

A clamp for securely locking a spring type battery cable terminal to a battery post. The clamp is bail shaped and stiff and has two ends which are turned inwardly. A concave section is located on a portion of the clamp symmetrically between the ends thereof to accommodate the manipulating tabs of the cable terminal. Two tapped openings approximately opposed to the ends of the clamp and which are symmetrically positioned with respect to the concave portion extend through the clamp and screws are threaded therethrough. In use the clamp is placed over a spring type battery cable terminal which is in engagement with a battery post. The screws are rotated in their respective openings until they tightly press against the spring legs of the terminal. As a consequence of this the ends of the clamp are urged against spaced points of the terminal remote from the screws and the terminal thereby is held in tight contact with the battery post. In another embodiment an inwardly projecting nub is used in place of one of the openings and the associated screw.

10 Claims, 4 Drawing Figures

PATENTED OCT 17 1972 3,699,506

INVENTORS
JESSE R. HOLLINS
BY Kirschstein, Kirschstein, Ottinger + Frank
ATTORNEYS

CLAMP FOR VEHICLE STORAGE BATTERY SPRING TYPE CABLE TERMINAL

BACKGROUND OF THE INVENTION

1. Field of the Invention

Clamping means for securely locking a spring type storage battery cable terminal to a battery post 2. Description of the Prior Art All commercial production vehicles which are made today include an engine which provides power for driving the vehicle. Additionally, nearly all vehicles include a storage battery for providing power to the vehicle starter motor for starting the vehicle engine.

Vehicle storage batteries usually include two posts with each post having a slight upward taper. One post is the negative terminal of the battery while the other post is the positive terminal thereof. Cables are provided for connecting the posts of the battery to the different electrical accessories of the vehicle as will be apparent to those skilled in the art.

On many vehicles these cables include a spring type terminal. Unless specified to the contrary all battery cable terminals referred to herein are of the spring type. Generally, the spring type battery terminal includes opposed spring legs which are segments of a circular ring. A gap exists between the free ends of the legs when the legs surround a battery post. Crossed spreading manipulating tabs which face each other are secured to the free ends of said spring legs. When it is desired to place the spring type battery terminal about a battery post a pliers is used to move the ends of the spreading tabs towards each other, this action moving the spring legs away from each other. With the spring legs so positioned the spring type battery terminal is placed around the battery post. The grip of the pliers on the spreading tabs is then released and the inherent resiliency of the spring legs tightly grips the battery post so that contact is made between the post and the cable terminal.

Due to metallurgical limitations, the spring type cable terminal has very limited spring flexing ability.

While the above described spring type cable terminal for storage batteries is widely used there are many drawbacks associated with it which severely detract from its usefulness. As an example, due to the difference in metallurgical composition of the battery post and the electrical cable terminal sulfation sets in causing the electrical resistance between the post and terminal to increase due to a salt deposit therebetween. The flow of full battery current from the battery to the electrical equipment, especially where high amperage is needed such as to the electric cranking motor and its solenoid is detrimentally reduced. This created a poor electrical connection between the terminal and the battery post which retarded the flow of current from the battery and in some instances became so bad as to prevent the starter solenoid or the starter motor from properly operating. THe poor connection between the terminal and battery post also limited the current flow to the headlights sometimes to such an extent as to result in an underrated light emission. Furthermore, it prevented the battery from being properly charged by the vehicle alternator or generator.

The vibrations which inherently resulted from the operation of the vehicle could cause the spring type terminal to move upwardly along the tapered battery post to the smaller cross-sectional areas thereof. As a result of this movement the spring action of the legs due to their limited spring action was not as effective as when the terminal was gripping the larger cross-sectional portion of the post. Consequently, the electrical connection between the battery post and the terminal was adversely effected even though this condition might not be apparent by visual inspection.

Attempts to improve the electrical connection between the battery post and the spring type battery cable terminal have involved removing the terminal from the battery post and scraping or wire brushing the circumference area of the battery post. Additionally, the inside surfaces of the spring legs were scraped or wire brushed and the spring type battery cable terminal was reattached to the battery post with good electrical connection therebetween. Although these steps initially improved the electrical connection between the battery post and terminal the eventual result was a deterioration of said connection because the removal of metal from the battery post and from the inside surface of the terminal increased the internal diameter of the spring legs of the terminal while decreasing the cross-sectional area of the post. Consequently, the terminal had a weaker grip on the battery post increasing the chances of a chemical deposit being formed between the post and spring legs as above noted and increasing the electrical resistance between the terminal and the post.

SUMMARY OF THE INVENTION

It is, therefore, an object of the present invention to provide an improved means for clamping a spring type battery cable terminal in tight contact with a storage battery post.

Another object of the present invention is to provide means for securely locking a spring type battery cable terminal to a storage battery post so that a good electrical connection is obtained and maintained therebetween.

A further object of the present invention is to provide means for securely locking a spring type battery terminal to a terminal post of a storage battery which means is capable of achieving the above and other objects and which can be conveniently installed.

Briefly, according to the present invention, the foregoing as well as other objects are achieved by a yoke-shaped clamp that has two inturned ends which are spaced from each other. The clamp is made of stiff material and is generally circular in cross-section. The inside surface of the clamp is concave at a point centered between the ends for a reason that will soon be readily apparent. A first threaded opening extends through a portion of the clamp adjacent the concave portion thereof and a screw extends through said opening with the screw threads in engagement with the threads in the opening. Additionally, a second threaded opening on the clamp extends through another portion thereof with a screw threaded therethrough. The first and second openings are symmetrically positioned with respect to the concave portion.

In normal operation the spring type cable terminal is secured to the battery post in the conventional manner. The screws on the clamp are rotated so that the free ends thereof are adjacent the inside surface of the clamp. The clamp is positioned over the terminal with the spreading tabs received in the concave portion of the clamp. The screws are then rotated so that one end of each screw is firmly urged into contact with a portion of the outside surface of a spring leg of the cable terminal. The contact of the screws with the terminals draws the two free ends of the clamp into tight contact with the terminal and presses the terminal against the battery post so tightly that the terminal cannot shake off so that the area of terminal post contact is maximized and so that in this area there are no gaps where products of corrosion can inhibit good electrical conductance.

In another embodiment of the present invention there is a nub on the inside surface of the clamp in place of one of the screw arrangements just described.

Other objects of the invention will be pointed out hereinafter.

The invention accordingly consists in the features of construction, combinations of elements and arrangements of parts which will be exemplified in the devices hereinafter described and of which the scope of application will be indicated in the appended claims.

BRIEF DESCRIPTION OF THE DRAWINGS

In the drawings wherein like parts in the different FIGS. are identified by the same reference numerals.

DESCRIPTION OF THE PREFERRED EMBODIMENTS

Figure 1:
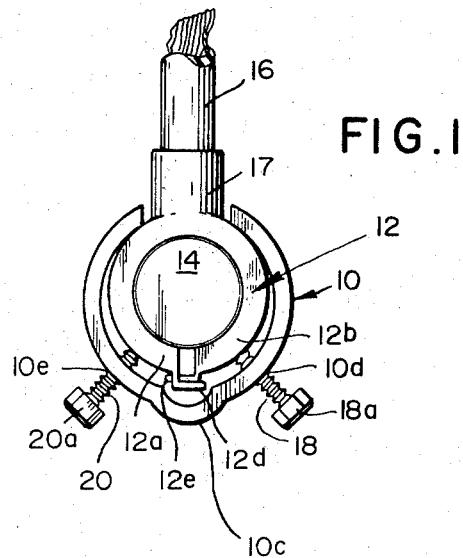
FIG. 1 is a top plan view of a clamp securely locking a spring type cable terminal to a battery post according to the present invention.
Figure 2:
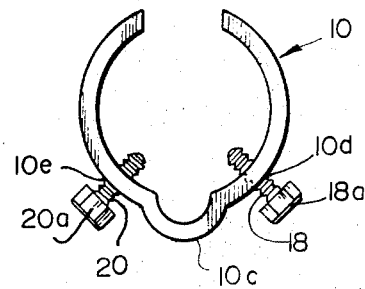
FIG. 2 is a top plan view of the clamp shown in FIG. 1.

In FIG. 1 of the drawings a clamp 10 which has the shape of a yoke or bail according to the present invention is shown for securely locking a spring type battery cable terminal 12 to a battery post 14. Battery post 14 is a conventional terminal post on a storage battery while spring type battery cable terminal 12 is also conventional. Terminal 12 includes a pair of spring legs 12a and 12b which are each circular and when the spring legs are placed about a battery post a gap exists between the free ends of said legs. Secured to the free end of each of said legs are spreading tabs 12d and 12e with the tabs crossing and facing each other as can be seen in FIG. 1.

A battery cable 16 is secured to the terminal by tube 17 integral with the terminal as is conventional. The spring type battery cable terminal structure as just described is conventional and is found in a great many vehicles today.

Clamp 10 is a ring which may be made of any stiff strong material, for example it may be of drop forged iron. The value of its electrical conductivity is of no importance. The ring is generally circular except that a gap exists between its ends to accommodate the tube 17. The gap is less than 180° and is less than the diameter of the cable terminal. The ends of the clamp are parallel to each other and a concave portion 10c of the ring is symmetrically located with respect to the ends thereof.

Located adjacent concave portion 10c on clamp 10 is a tapped hole 10d which extends completely through the clamp. A screw 18 has its threads in engagement with the threads in opening 10d and is provided with a head 18a for rotating the same. In a similar fashion a tapped opening 10e extends through another portion of clamp 10 with openings 10d and 10e being symmetrically located with respect to concave section 10c. A screw 20 having a head 20a extends through opening 10e with threads of the screw in engagement with the threads of the opening. Preferably the openings extend radially of the clamp.

In use clamp 10 is positioned as shown in FIG. 1 with the spreading tabs received in concave portion 10c. Screws 20 and 18 are rotated so as to be strongly urged against the respective spring legs of battery cable terminal 12 and preferably against lower portions thereof. The urging of the screws against the spring type battery cable terminal pulls the free ends of the clamp against the cable as seen in FIG. 1, to wit, in tight contact with the spring legs thereof. Thus, there are four points where inward force is exerted on the spring type battery cable terminal urging it into contact with the battery post, these points being at the ends of the clamp and where the screws are located.

Hence the cable terminal is squeezed, i.e., constricted on the spring type battery cable terminal and the terminal correspondingly is squeezed in tight contact on the battery post 14 providing good electrical connection therebetween. Additionally, due to the constricting force on the spring type battery cable terminal the terminal tightly grips battery post 14 and will not axially slide along the post as the vehicle in which the battery is utilized vibrates.

Further, the tight gripping of the spring type battery cable terminal on the battery post reduces the formation of a chemical deposit between the post and spring legs as above noted.

Figure 3:
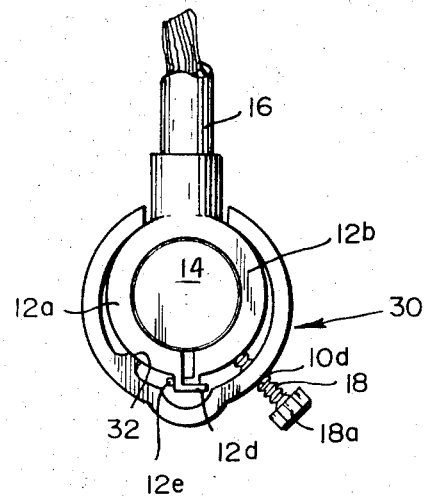
FIG. 3 is a top plan view of an alternate clamp of the present invention securely locking a spring type cable terminal to a battery post.
Figure 4:
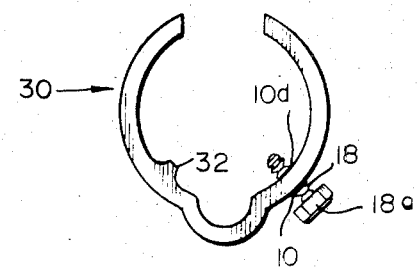
FIG. 4 is a top plan view of the clamp shown in FIG. 3.

In FIGS. 3 and 4 of the drawings an alternate clamp 30 embodying the present invention is described. Clamp 30 is identical to clamp 10 except that in clamp 30 only one screw is utilized. In clamp 30 a nub 32 extends inwardly of one section of the clamp and along with opening 10d is symmetrically positioned with respect to concave section 10c.

Clamp 30 is used in the same manner as clamp 10 except that only one screw is utilized. When this screw is rotated so as to tightly press against a spring leg the portion of the clamp in which the screw is received moves radially outwardly and the free ends of the clamp are tightly drawn against the portions of the spring legs adjacent the cable. The segment of the clamp on which nub 32 is located elastically deforms with the nub exerting a force against a portion of spring leg 12a. Thus it can be seen that forces are placed on the spring type battery cable terminal at four locations to urge said terminal to firmly grip battery post 14.

It thus will be seen that there is provided devices which achieve the various objects of the invention and which are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having just described the present invention there is claimed as new and desired to be secured by Letters Patent:

1. Apparatus for securing a spring type battery cable terminal to a battery post comprising a clamp, said clamp made of stiff material and including means for constricting a spring type battery cable terminal on a battery post, said clamp being generally yoke shaped and including two ends which are spaced from each other, said ends each being turned inwardly.

2. Apparatus comprising a battery terminal post, a spring type battery cable terminal surrounding said battery post and in contact therewith, said spring type battery cable terminal including a pair of spring legs, each of said spring legs including a free end with a gap existing between the free ends, a spreading tab secured to each free end with said tabs crossing and facing each other and a clamp made of stiff material and including means for constricting the spring type battery cable terminal on the battery post.

3. Apparatus according to claim 2 wherein said clamp includes a concave portion for receiving spreading tabs on the spring type battery cable terminal.

4. Apparatus according to claim 3 wherein said ends are symmetrically positioned with respect to said concave portion.

5. Apparatus according to claim 2 wherein said means includes a tapped opening extending through a portion of said clamp, and a screw threadedly engaged therein.

6. Apparatus according to claim 5 wherein said means further includes a second tapped opening extending through said clamp and a screw threadedly engaged therein.

7. Apparatus according to claim 6 wherein said clamp further includes a concave portion for receiving spreading tabs on the spring type battery cable terminal, said first and second openings being symmetrically positioned with respect to the concave portion of said clamp.

8. Apparatus for securing a spring type battery cable terminal to a battery post comprising a clamp, said clamp made of stiff material and including means for constricting a spring type battery cable terminal on a battery post, said means including a tapped opening extending through a portion of said clamp, and a screw threadedly engaged therein, said means further including a nub extending inwardly from a portion of said clamp.

9. Apparatus according to claim 8 wherein said clamp includes a concave portion for receiving spreading tabs of a spring type battery cable terminal with said nub and opening being symmetrically positioned with respect to said concave portion.

10. Apparatus for securing a spring battery cable terminal including a pair of spring legs with the legs having a free end and a gap existing between the free ends and spreading tabs at each of the free ends with the tabs crossing and facing each other to a battery post comprising a clamp, said clamp made of stiff material and including means for acting on at least three discrete portions of a spring type battery cable terminal for constricting a spring type battery cable terminal about a battery post.

* * * * *